United States Patent [19]

Edwards et al.

[11] 4,298,833
[45] Nov. 3, 1981

[54] APPARATUS FOR DAMPING OPERATOR INDUCED OSCILLATIONS OF A CONTROLLED SYSTEM

[75] Inventors: John W. Edwards; John W. Smith, both of Lancaster, Calif.

[73] Assignee: The United States of America as represented by the Administrator of the National Aeronautics and Space Administration, Washington, D.C.

[21] Appl. No.: 126,064

[22] Filed: Feb. 29, 1980

[51] Int. Cl.³ .............................................. G05B 13/00
[52] U.S. Cl. .................................. 318/561; 318/620; 318/621; 318/622
[58] Field of Search ................ 318/561, 621, 622, 620

[56] References Cited

U.S. PATENT DOCUMENTS 3,446,946 5/1969 Andeen ............................... 318/561
4,030,011 6/1977 Hendrick et al. .................... 318/561

Primary Examiner—J. V. Truhe
Assistant Examiner—Eugene S. Indyk

Attorney, Agent, or Firm—Paul F. McCaul; John R. Manning

[57] ABSTRACT

Apparatus for damping operator induced oscillations of a controlled system responding to an operator controlled signal (DEP) utilizing a lag-lead filter (14) for frequency and amplitude estimation of the control input, and a rectification and smoothing filter (16) for producing a signal proportional to the absolute value of the frequency and amplitude estimate for use in suppression of the control system output signal (DEC). In one embodiment, this is accomplished by computing a correction signal in a correction generating section (18). In a second embodiment, a second rectification and smoothing filter (21) produces a signal proportional to the absolute value of the controlled input signal. A ratio of the outputs of the first and second rectification and smoothing filters is then used in a generator (24) to generate a gain factor $k_q$ for the control system to reduce the gain of the output signal of the control system, thereby to provide a damped control output signal without rate limiting the controlled element.

10 Claims, 11 Drawing Figures

APPARATUS FOR DAMPING OPERATOR INDUCED OSCILLATIONS OF A CONTROLLED SYSTEM

ORIGIN OF THE INVENTION

The invention described herein was made by an employee of the U.S. Government and may be manufactured and used by and for the Government for Government purposes without the payment of any royalties thereon or therefor.

TECHNICAL FIELD

This invention relates to apparatus for damping operator induced oscillations of a controlled system, and more particularly a pilot controlled aircraft or spacecraft.

BACKGROUND ART

In many operator controlled systems, operator induced oscillations are sometimes experienced, particularly when very rapid corrections are made so that the probability and extent of overcorrection increases. For example, in an aircraft, particuarly one of high performance or of special flight characteristics, such as the space shuttle vehicle under development by NASA, pilot-induced oscillations (PIO) may be experienced during the flare and landing. The frequency of the PIO in the pitch axis for the space shuttle vehicle was approximately 3 rad/sec, and the pilot utilized a significant portion of his full control authority. Analysis has indicated that the source of the problem is a combination of basic vehicle handling qualities, time delay of approximately 0.04 sec through the digital flight control system computer, and rate limit of 20 deg/sec of the elevator actuators.

Each control system will have a characteristic control gearing schedule for an operator input that is generally not linear but rather curved in both quadrants, with a positive response for an operator input of one control direction, and a negative response for an operator input of the opposite direction, with the response increasing nonlinearly as the operator input increases in either direction. The gearing schedule may include a "deadband" near center to decrease the system sensitivity to small operator inputs, but beyond that "deadband," the response of the system to a control input can be quite large, resulting in the possibility of overcorrection leading to a large reverse correction, and then oscillation if the process is repeated. To prevent oscillation, it is desirable to reduce the operator's authority over the control system as the frequency of the operator's control input increases. Typical of the prior art is disclosed in a U.S. Pat. No. 4,030,011 titled Multimode Control Systems.

In that prior art system, a control input signal is simultaneously high-pass filtered and low-pass filtered. The high-pass filtered signal is amplitude limited and added to the low-pass filtered signal. The sum is then subtracted from the control input signal to form the basic system control signal to which an accelerometer signal similarly conditioned is added. A further input from a pitch rate gyro is conditioned and combined with the system control signal applied to an elevator servo of an aircraft. However, these accelerometer and pitch rate signals are independent of the problem of reducing the operator's authority as a function of the operator's control input frequency.

An advantage of the prior art system is that mode switches are not required, but the frequency response characteristic is basically one of very low gain for low frequency signals, with increasing gain to a limit as frequency increases. The limit to which gain increases with frequency is set by the high-pass filter limiter. The result is the ability to limit the pilot control signal of large amplitude and, to a lesser extent, limit the pilot control signal of high frequency content. That does not satisfy the requirement for the combination of high pilot gain during the critical landing task, coupled with the ability to reduce the rate of the control system for large pilot inputs. This requirement is a significant factor in pilot-induced oscillations. Linear filtering techniques of the type used in the aforesaid patent have not been able to resolve the PIO problem since the required rate reduction involves unacceptable phase lags.

SUMMARY OF THE INVENTION

In accordance with the present invention, a unique nonlinear suppression filter is provided for a system having linear and quadratic terms in its control transfer function of the form $DEC=(A+B|DEP|)DEP$, where A is a constant less than one, B is a constant smaller than A by an order of magnitude, DEP is an operator controlled input signal and DEC is the system output control signal. The linear term provides the desired sensitivity to small operator inputs while the quadratic term allows full control authority. The nonlinear suppression filter is provided in order to decrease the authority of the quadratic term and avoid rate limiting during critical tasks, such as landing in the case of an aircraft control system. This is done by modifying the unsuppressed control signal output as a function of the frequency and amplitude of an operator input signal. The suppression filter is comprised of a lag-lead filter means for frequency and amplitude estimation followed by a filter means for rectification and smoothing, and means responsive to the output of the rectification and smoothing means for producing a correction to suppress the control signal as a function of frequency and amplitude. In one embodiment, the correction is set equal to zero for low amplitudes of the input signal. At higher amplitudes, the correction increases as a function of frequency and amplitude so that the greater the frequency the greater the suppression correction for the same control input, thereby avoiding any rate limiting of the system output signal, DEC.

In a second embodiment, the output of the rectification and smoothing means for the frequency and amplitude estimation is divided by the absolute value of the control input, DEP, obtained by a rectification and smoothing means. The ratio is then used to produce an appropriate gain factor, Kq, for the absolute value of the control signal in the system control transfer function, which is then of the form $DEC=(A+B\cdot K_q\cdot|DEP|)DEP$.

In preferred implementations of both embodiments, the frequency and amplitude estimation means operative on the input signal DEP has the following transfer function:

$$b = DEP\left[1 - \frac{1}{4}\left(\frac{S+20}{S+10}\right)^2\right]$$

where S is the Laplace transform variable. The rectification and smoothing means yields a signal, e, equal to $2\frac{1}{2}|b|$.

In the first embodiment, the output of the rectification and smoothing means is employed in computing means to generate a correction signal, DEC 2, to be subtracted from the unsuppressed control signal, DEC 1, from the control system response to an input signal, DEP. Threshold detection means responds to the input signal, DEP, to set DEC 2 equal to zero for values of the input signal below a predetermined level, thereby to assure full operator control near null. This makes oscillation suppression inoperative at values of the input signal below the threshold, and operative above the threshold. The result is a sudden transition (kink) in the control system characteristics at the threshold value. Such a kink may be undesirable.

To avoid any kink and avoid the dependence of the amount of suppression applied on both the frequency and amplitude of the input signal, the second embodiment has been developed in which the amplitude of the input signal is generated through a second rectification and smoothing filter means operative on the input signal DEP to yield a signal equal to $2\frac{1}{2}|DEP|$. The output of this second rectification and smoothing filter is coupled to a divider through a circuit having unity gain and a stop at a predetermined low level below which its output will not go. This is so that in the divider, which produces the ratio of $2\frac{1}{2}|b|$ to $2\frac{1}{2}|DEP|$, division by a small value of $2\frac{1}{2}|DEP|$ will be disallowed in forming the quotient $|b/DEP|$. This ratio is then used in a function generator to produce the gain factor, Kq, for the control transfer function as a function of frequency. The gain factor Kq is programmed to eliminate the quadratic term of the control transfer function (i.e., Kq is set equal to 0) for a particular frequency, and to increase linearly as frequency decreases for greater authority at lower frequencies. Above that particular frequency, the gain factor increases with an opposite (negative) sign, up to a predetermined value so that no further suppression is given for frequencies above that value.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
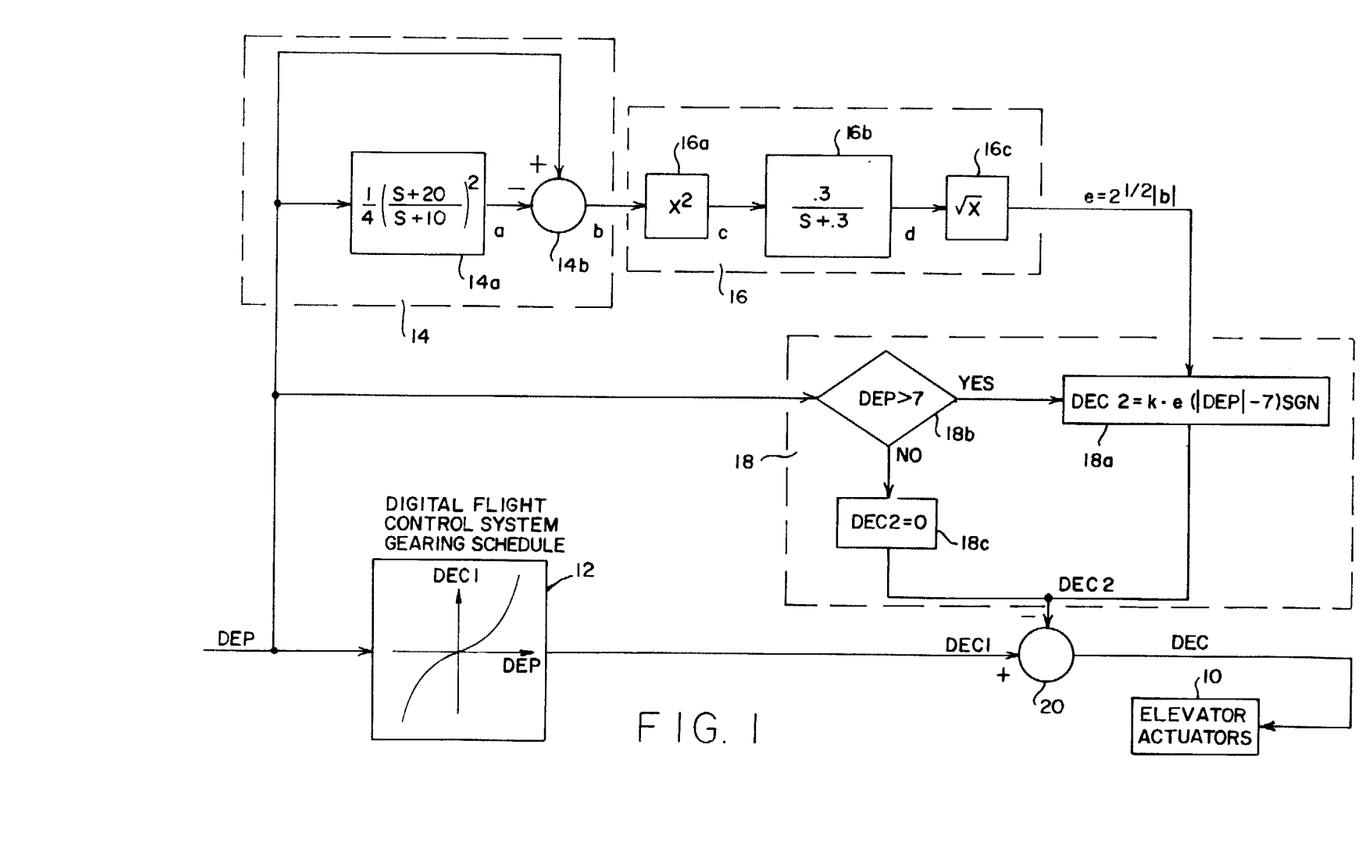
FIG. 1 is a functional block diagram of a first embodiment of the invention.

Referring now to FIG. 1 of the drawings, a first embodiment of the invention is disclosed. While the particular application contemplated for the invention is a system for control of elevator actuators 10 in a space shuttle vehicle or aircraft, it should be understood that the invention may have other applications where an operator seeks to control a system and it is found necessary to provide damping for operator induced oscillations in the system.

On the final approach for landing a space shuttle vehicle or aircraft, a pilot-induced oscillation (PIO) may be experienced during the flare just prior to landing. The frequency of the PIO in the pitch axis is approximately 3 rad/sec in the case of a space shuttle vehicle, and the pilot uses a significant portion of the full pilot control authority. Analysis has confirmed the existence of PIO tendencies in such a situation. The source of the problem is a combination of basic shuttle landing qualities, time delay through a digital flight control system having a digital computer, and rate limiting of the elevator actuators. The implementation of the control gearing schedule of the digital flight control system for the elevator actuators is represented in FIG. 1 by a functional block 12.

The cockpit of the space shuttle vehicle is located at the approximate center of rotation of the vehicle for pitch manuevers, which deprives the pilot of some motion cue information. Also, the time delay through the digital flight control system 12 of approximately 0.04 sec., and the elevator actuator rate limit of 20 deg/sec, aggravate the PIO tendency of the space shuttle vehicle. Other vehicles or spacecraft will have such characteristics, though of different values, and still other types of operator controlled systems will have similar characteristics that may aggravate any PIO tendency.

Figure 2:
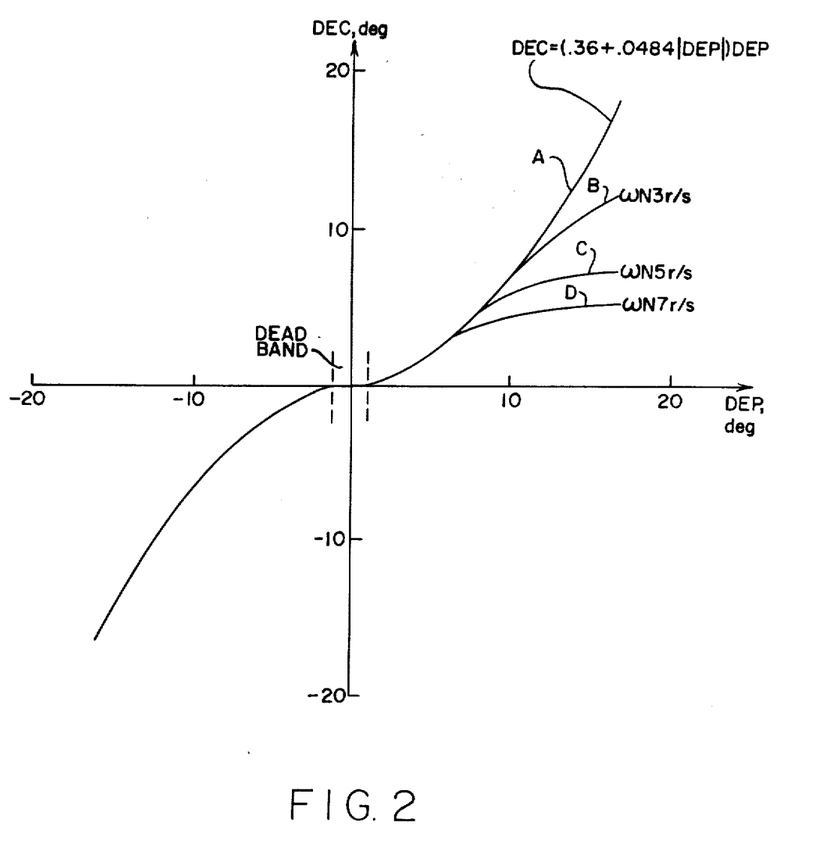
FIG. 2 illustrates in a graph the system response characteristic of a control system and for the positive quadrant, the response characteristic desired to avoid rate limiting while suppressing operator induced oscillations for several frequencies.

FIG. 2 shows the "stick gearing schedule" (digital flight control system characteristic) of the space shuttle vehicle by way of example, and not by way of limitation. That characteristic, shown by the curve A, is given by the following equation:

$$DEC = (0.36 + 0.0484|DEP|)DEP \qquad (1)$$

where DEP is the pilot controlled input signal to the control system, and DEC is the output signal of the control system to the elevator actuators without any oscillation suppression. A ±1.15 degrees deadband is included in the characteristic. The combination of linear and quadratic terms in this characteristic is intended to give acceptable handling qualities for the space shuttle vehicle near null while also allowing full control surface authority.

FIG. 2 also shows, in the upper right hand quadrant, the typical characteristics B, C and D which would be required to avoid rate limiting for several frequencies ($\omega$) of approximately 3, 5 and 7. The combination of high pilot gain during the critical landing task, coupled with the ability to rate limit the actuators with large pilot inputs, are significant factors in PIO problems. Linear filtering techniques have not been able to resolve this problem since the required reduction involves unacceptable phase lags. As a consequence, an adaptive system comprised of sections 14, 16 and 18 shown in FIG. 1 was developed which will modify the space shuttle characteristic as a function of frequency and amplitude of the pilot's input as shown by the typical characteristics B, C and D in FIG. 2.

The adaptive system involves a frequency and amplitude sensitive lag-lead filter 14a in section 14, a smoothing filter 16b in section 16, and a correction generator 18a in section 18 for altering the characteristic from the curve A to the typical curves B, C and D shown in FIG. 2. It should be noted that the typical curves B, C and D are representative of an infinite number of curves which are produced by this correction generated as a function of fequency and amplitude of the pilot input DEP. The correction, DEC 2, generated is subtracted from the uncorrected signal, DEC 1, through a differencing circuit 20 to produce a control signal, DEC. The system thus suppresses pilot-induced oscillations of the space shuttle vehicle.

The correction generator receives the output of the rectification and smoothing section 16 as a signal e, that is in turn generated from the output b of the lag-lead section 14 by first squaring that signal in circuit 16a, then filtering it through a circuit 16b having a Leplace transfer function $0.3/(S+0.3)$, and then deriving the square root of the output in a circuit 16c. The resulting signal e is an estimate of both frequency and amplitude. The signal e is then used to calculate a damping correction $DEC\ 2 = K.e\ (|DEP| - 7)SGN$ where SGN is the sign of the input DEP. However, a threshold detector 18b of section 18 sets DEC 2 to zero through a clamping circuit 18c for any control input DEP less than 7 degrees.

Figure 3:
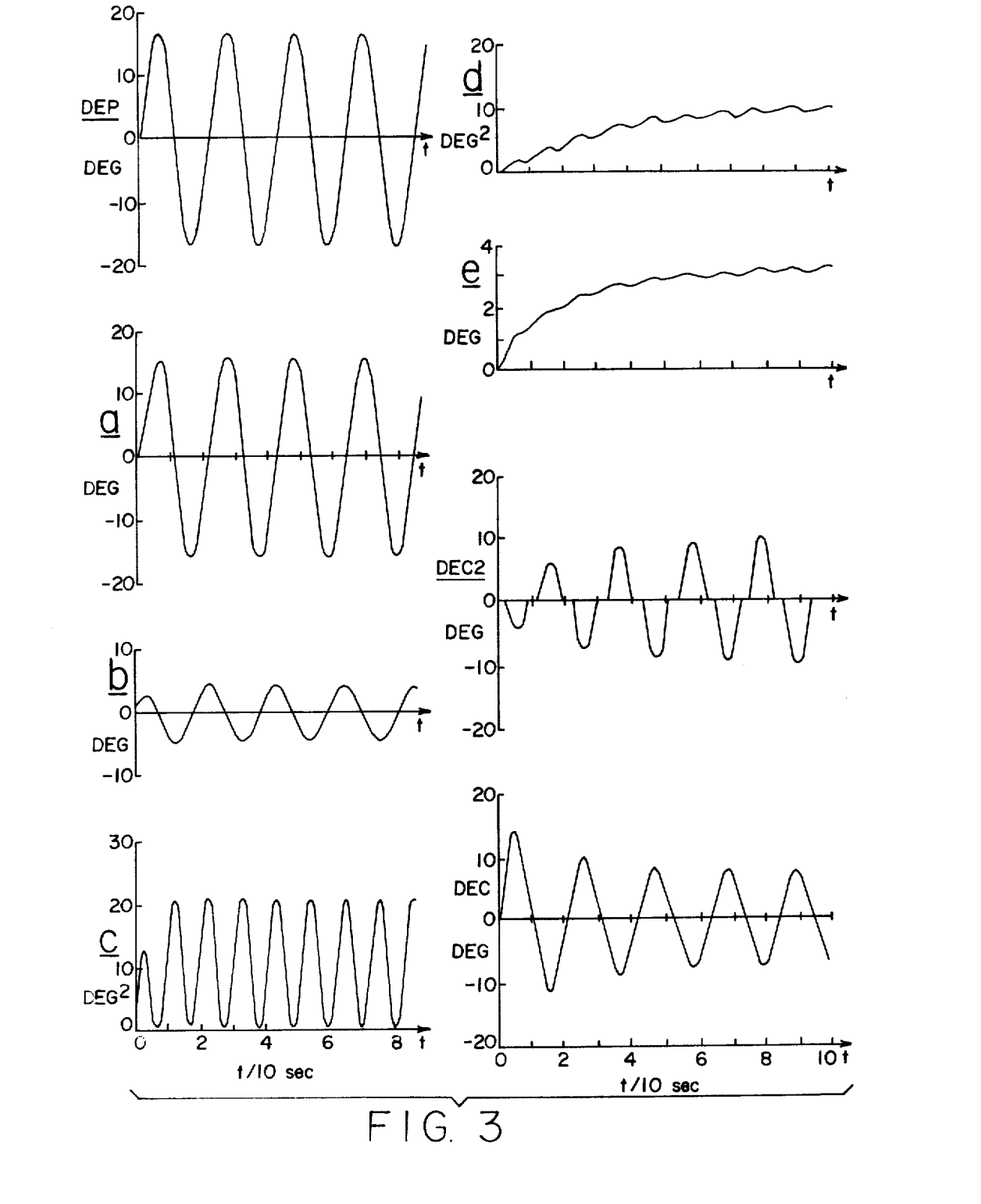
FIG. 3 illustrates in graphs a, b, c, d and e the steady state filter operation of the embodiment of FIG. 1 at points labeled a, b, c, d and e, and illustrates in graphs DEP, DEC 2 and DEC an input signal, a correction signal derived from the input signal, and a corrected control output signal in the embodiment of FIG. 1.

FIG. 3 illustrates the steady-state operation of the adaptive correction system in terms of traces for signals at test points a, b, c, d and e in FIG. 1 for the output signal DEC developed from the input signal DEP. Nominal values of $|DEP| \simeq 17$ deg, $\omega \simeq 3$ rad/sec and $K = 0.32$ are assumed, where K is a gain factor. The gain roll-off of the lag-lead filter 14a gives the waveform a, and the difference between DEP and a obtained by a circuit 14b gives the waveform b. The amplitude of waveform b is a function of the frequency and amplitude of DEP; the rectification and smoothing section, which produces waveforms c, d and e, measures this amplitude. The DEC 2 waveform illustrates the effect of the 7 degrees threshold and the waveform of the final elevator command, DEC, is reduced in amplitude by approximately 5 degrees.

In practice, the PIO suppression system shown in FIG. 1 may be implemented with analog circuits. Reference has therefore been made to "circuits," but the suppression system is preferably implemented in digital form, with the Laplace transfer functions of blocks 12a and 16b included as digital filters operating at a convenient sample rate, for example, 20 per second.

Figure 4:
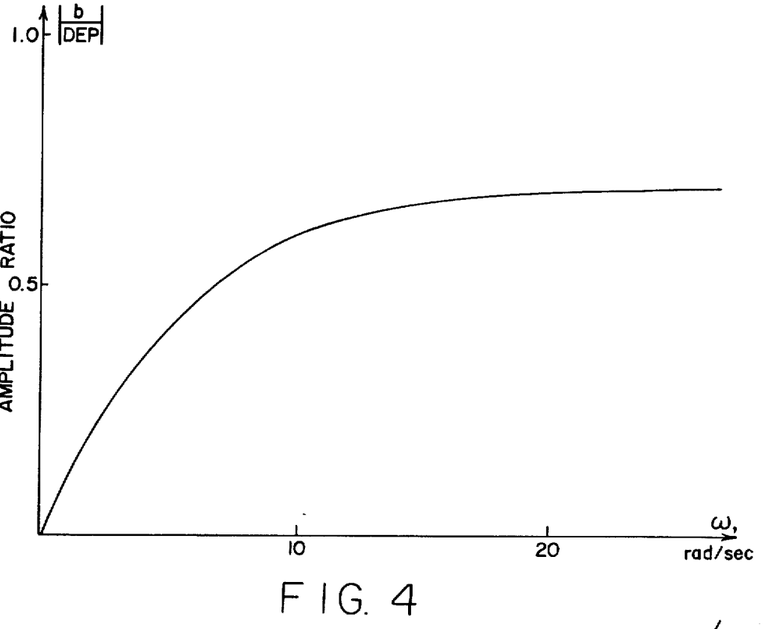
FIG. 4 illustrates in a linear plot the amplitude ratio of the signal at point b in FIG. 1 to the input signal DEP due to oscillations in the input signal.

The amplitude ratio of the signal at point b (waveform b in FIG. 3) due to DEP oscillations is shown in FIG. 4 in a linear plot of the ratio $\oplus b/DEP|$ versus $\omega$(rad/sec) at the sample rate of 20 samples per second. This amplitude ratio increases from zero at low frequencies and approaches a maximum of 0.7 at approximately 20 rad/sec. From zero to about 10 rad/sec, the ratio is nearly a linear function of frequency.

Figure 5:
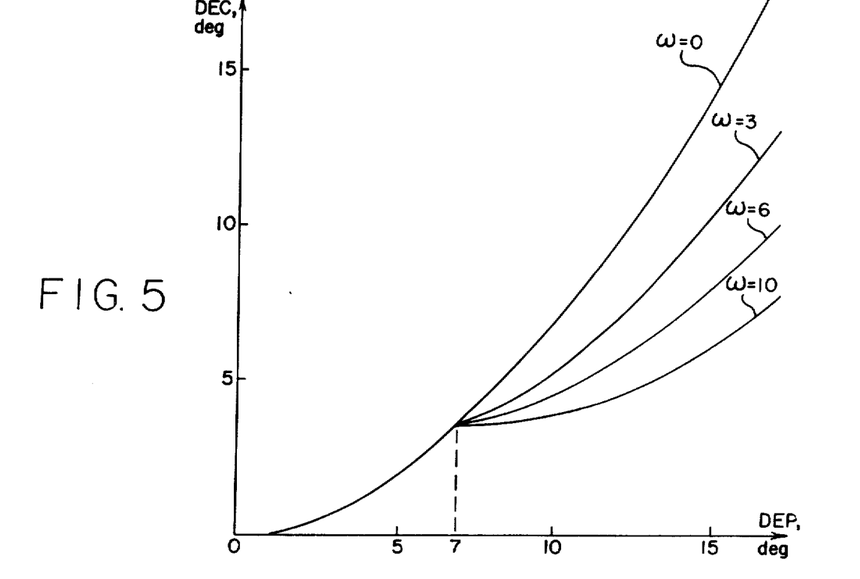
FIG. 5 illustrates the steady-state operation of the embodiment of FIG. 1 in producing an output signal DEC for several frequencies of the input signal DEP for a predetermined and constant gain factor K=0.14.
Figure 6:
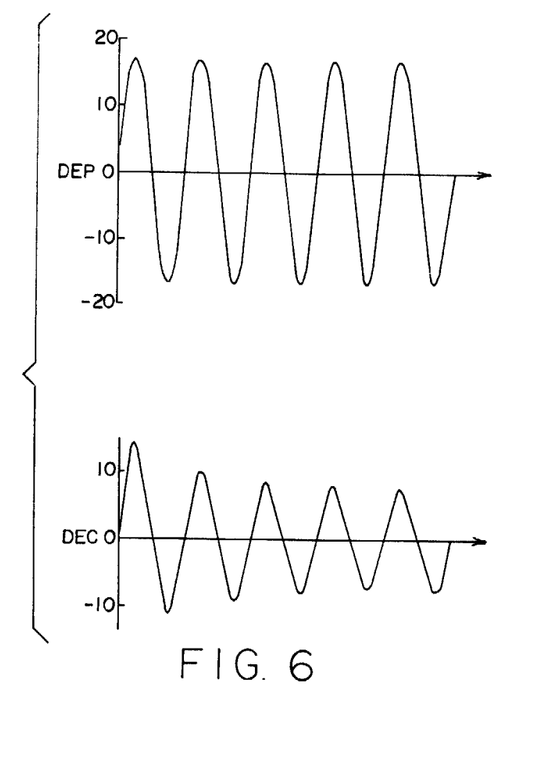
FIG. 6 illustrates the transient response (DEC) of the embodiment of FIG. 1 to a sinusoidal input signal (DEP) starting from rest.

FIG. 5 shows the steady-state operation of the system of FIG. 1 in a plot of the DEC output versus the DEP input for several frequencies ($\omega = 0$, 3, 6 and 10) for $|DEP| = 17$ degrees and a gain factor $K = 0.14$. Since the magnitude of the signal at the output of the rectification and smoothing filter at point e of FIG. 1 (plot e in FIG. 3) is a function of both $|DEP|$ and $\omega$, any decrease in $|DEP|$ will shift the curves plotted in FIG. 5 upwards. FIG. 6 presents the results from a digital simulation showing the transient response output, DEC, of the system of FIG. 1 starting from rest when forced by a sinusoidal pilot input, DEP. Both DEP and DEC are plotted as a function of time on the same time scale. The parameter values were: $\omega = 3$ rad/sec, $|DEP| = 17$ degrees, and $K = 0.32$. The DEC plot illustrates the $\simeq 3$ sec settling time of the smoothing filter. The reduction of the amplitude of the control output, DEC, from the amplitude of the pilot input, DEP, keeps the elevator actuators from rate limiting and thus alleviates the tendency towards pilot induced oscillations. The digital simulation used to generate these plots was run at 20 samples per second and is representative of the rate which could be used to implement the filter. The filter parameters which have been used in these figures are not optimized; piloted simulations should be conducted to select optimum values. Criteria on possible parameter variations are given below:

Lag-lead Filter Breakpoints (10 and 20 rad/sec.) Changes to these parameters will modify the amplitude ratio curve of FIG. 4. Unity d.c. gain should be maintained.

Threshold (DEP = 7 degrees) Decreasing this parameter causes the system to begin operating at lower values of $|DEP|$ and increases the amount of suppression.

Suppression Gain ($K = 0.14$) Increases in K will directly increase the amount of suppression.

Smoothing Filter Bandwidth ($\omega = 0.3$ results in a 3 second settling time) Decreasing this bandwidth will speed up settling time but will add apparent hysteresis due to the increased ripple seen in the trace of e on FIG. 3. Piloted simulations of the shuttle vehicle landing task indicate constant DEP activity during the task. Thus the smoothing filter tends to be operated in a quasi-steady-state mode, and the 3 second settling time does not appear to be detrimental.

Figure 7:
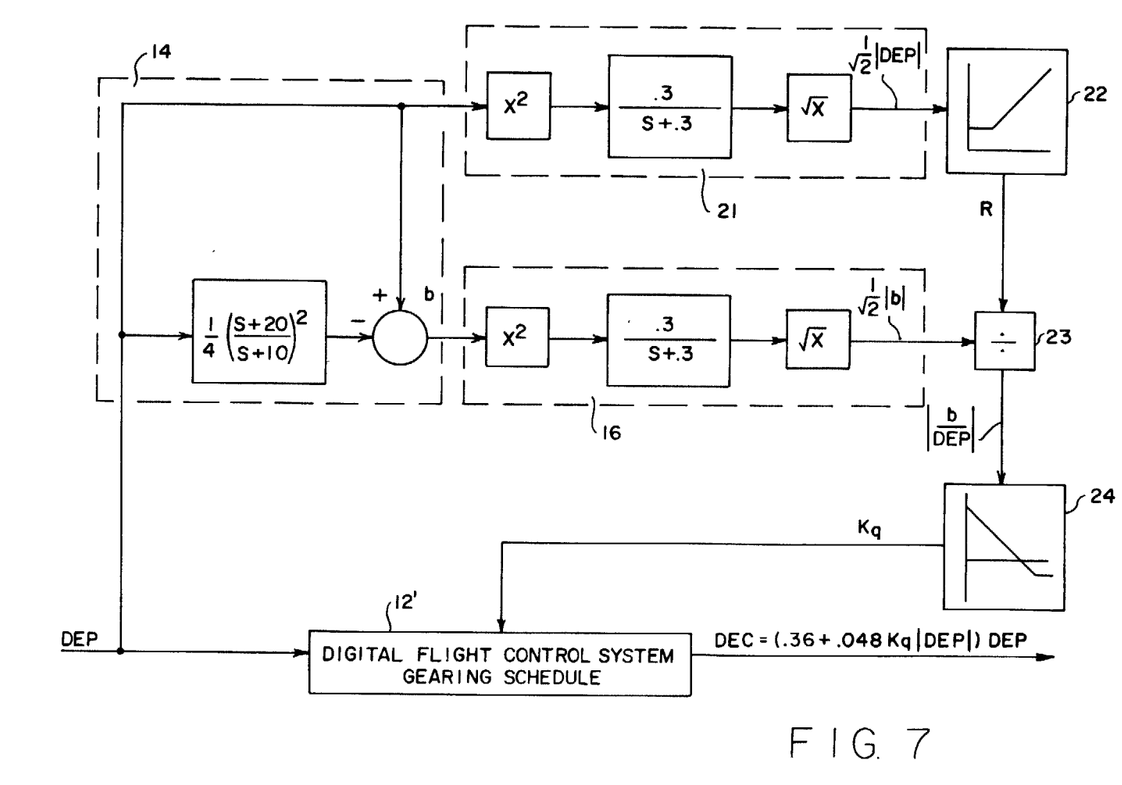
FIG. 7 illustrates a second embodiment of the present invention.

Two aspects of the PIO suppression system which may be bothersome are the kink in the characteristic at DEP = 7 degrees, as shown in FIG. 5, and the dependence of the amount of suppression on both $\omega$ and $|DEP|$. FIG. 7 illustrates an alternative embodiment which may alleviate these problems. For ease in understanding this second embodiment, the same reference numerals are employed in FIG. 7 for those parts common to the first embodiment shown in FIG. 1, and similar, but modified parts by the same reference numeral primed. Two changes have been made: The amplitude of DEP is now also estimated, and suppression is achieved via a multiplier gain, Kq, on the quadratic term of the basic control system characteristic.

Figure 8:
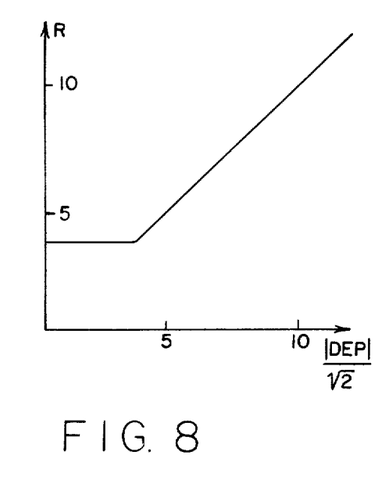
FIG. 8 illustrates the transfer function of a functional block 22 in FIG. 7.

The amplitude of DEP is estimated by a rectification and smoothing section 21 which produces from the input signal DEP an output signal equal to $2^{\frac{1}{2}}|DEP|$. The output of the filter 21 is applied to a minimum-value limiter 22 which has unity gain above a predetermined minimum value of about 3.75, as shown in FIG. 8. This is easily implemented in a digital computer as a function whose output R is set equal to the input, but not less than the predetermined minimum value. In an analog filter implementation, the same function could be achieved by conventional circuits, such as a circuit using clamping diodes and a load resistor, with the diodes arranged so that the signal applied across the resistor will follow the input, less any drop through isolating diodes, but not below the predetermined value set by a bias voltage on a clamping diode. This transfer characteristic of FIG. 8 for the functional block 22 in shown FIG. 7 is desired to disallow division in a functional block 23 by a small value of $2^{\frac{1}{2}}|DEP|$, which could produce quotients into a functional block 24 that are too large for the function of that block.

The functional block 24 calculates the gain factor Kq for the digital flight control system 12' which now produces a damped control output, DEC, directly with this gain factor Kq, as follows:

$$DEC = (0.36 + 0.0484\ Kq|DEP|)DEP \qquad (2)$$

Note that this is very similar to the control system characteristic in the embodiment of FIG. 1, but in that first embodiment, the output signal, DEC 1, is subjected to a damping correction, DEC 2, through a differencing circuit 20. Here the correction is introduced as a gain factor Kq on the quadratic term of the control system characteristic. The gain factor Kq thus varies as a function of the absolute value of the ratio b/DEP, which is to say as the frequency of the input signal, DEP. Introducing the correction factor Kq in the control system characteristic provides PIO suppression for values of the pilot input signal greater than 7 degrees without a kink, and the extent of the suppression increases as the frequency of the pilot input signal increases.

Figure 9:
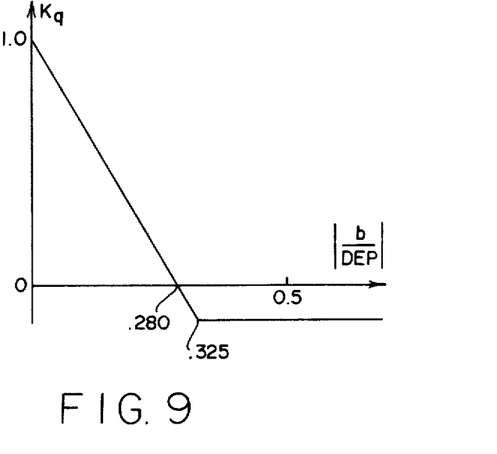
FIG. 9 illustrates a gain factor Kq generated as a function of the absolute value of the ratio b:DEP in a functional block 24 in FIG. 7.
Figure 10:
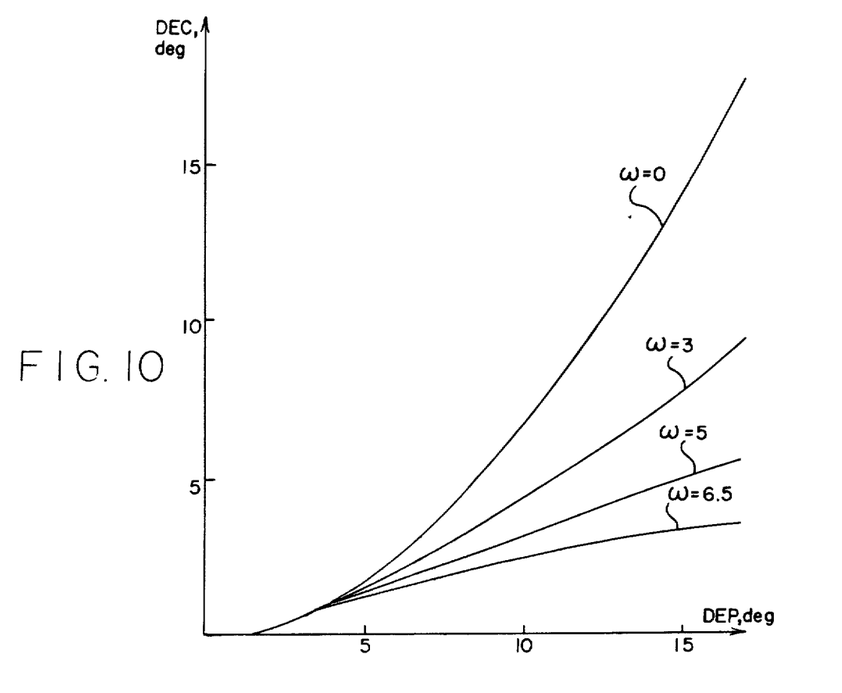
FIG. 10 illustrates the steady-state operation of the alternative embodiment in FIG. 7.

The filter gain schedule for the gain factor Kq is shown in FIG. 9. That filter gain schedule has been selected to eliminate the quadratic term of the control system characteristic for $\omega=3$ rad/sec (K=0 for |b/DEP|=0.28). In addition, no further suppression is given for $\omega>3.7$ rad/sec, where |b/DEP|=0.325. The schedule is easily implemented in a digital control system as a function subprogram. The result of steady state operation of the control system as a function of frequency, $\omega$, is shown in FIG. 10.

Figure 11:
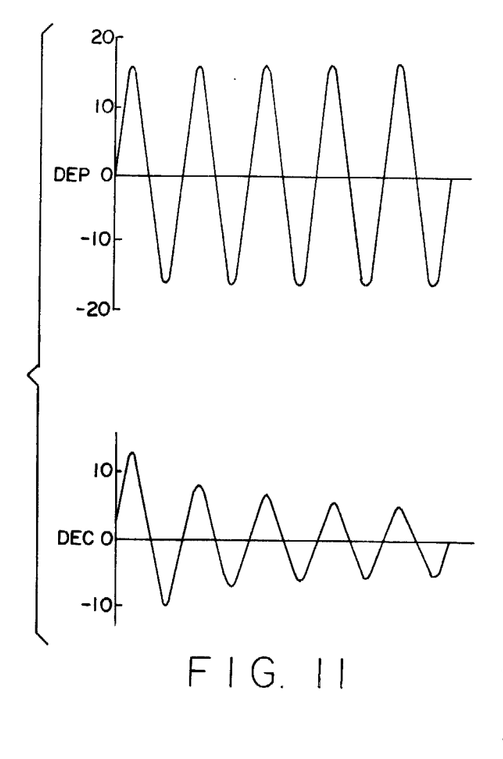
FIG. 11 illustrates the transient response (DEC) of the embodiment of FIG. 7 to a sinusoidal input signal (DEP) starting from rest.

Final parameter selection for this alternative embodiment should be made on the basis of piloted simulation evaluation. The nonlinearities involved and the adaptive nature of the filter make analytical evaluation of closed loop behavior difficult. FIG. 11 shows the transient response of this alternative PIO suppression filter when forced by a sinusoidal pilot input at 3 rad/sec. The input amplitude is 17 degrees. As in FIG. 5, the effect of the 3 second smoothing filter settling time and the deadband are evident. Now, however, comparing FIG. 10 with FIG. 5, it is seen that the kink is gone and the system characteristic is not amplitude dependent. Digital computer memory requirements to implement either filter are modest and the 20 sample per second sample rate presents no problem.

In summary, two alternative PIO suppression filters for the elevator control system of the space shuttle vehicle under development by NASA have been presented which will prevent rate limiting without introducing additional phase lag. Either filter may be easily implemented in the flight control computers of the vehicle. The same filters may be adapted to other space vehicles or aircraft, and to still other types of control systems where an operator input control may induce oscillations in the system response. Consequently, it is intended that the claims be interpreted to cover such applications, and to cover modifications and variations that may readily occur to one skilled in the art.

What is claimed is:

1. In a control system having linear and quadratic terms in its control transfer function of the form DEC=(A+B|DEP|)DEP, where A is a constant less than 1, B is a constant smaller than A by an order of magnitude, DEP is an operator controlled input signal and DEC is the output control signal of the system, a nonlinear filter system for modifying the output control signal DEC as a function of the frequency and amplitude of the operator controlled input signal DEP to suppress oscillations in the output control signal comprised of means for producing a signal the amplitude of which is a frequency and amplitude estimation of the input signal, means for rectifying and smoothing said frequency and amplitude estimation signal, and means responsive to the output of the rectification and smoothing means for suppressing the output control signal in proportion to the frequency and amplitude of said operator controlled input signal without rate limiting the control signal output.

2. A nonlinear filter sustem as defined in claim 1 including means for determining when the operator controlled input signal is less than a predetermined amplitude, and means responsive to said amplitude determining means for nullifying said suppressing means for operator controlled input signals less than said predetermined amplitude.

3. A nonlinear filter system as defined in claim 1 including rectification and smoothing means responsive to the operator controlled input signal for obtaining a second signal of an amplitude proportional to the absolute amplitude of the operator controlled input signal, means responsive to said second signal and to the output signal of said rectification and smoothing means for the signal output of said frequency and amplitude estimation means for producing a signal that is a ratio of the absolute value of the latter signal to the second signal, and means responsive to said ratio signal for producing a gain factor Kq for the absolute value of said operator controlled input signal in the transfer function of the form DEC=(A+B Kq |DEP|)DEP for suppression of the output control signal as a function of the frequency of the operator controlled input signal without any abrupt transition between no suppression and suppression of the output control signal.

4. A nonlinear filter system as defined in claim 1, 2 or 3 wherein said frequency and amplitude estimation means is a filter having a transfer function $$b = DEP \left[ 1 - \frac{1}{4}\left(\frac{S+20}{S+10}\right)^2 \right]$$

where S is the Laplace transform variable, and wherein said rectification and smoothing means yields a signal equal to $2\frac{1}{4}|b|$.

5. A nonlinear filter system as defined in claim 2 wherein said frequency and amplitude estimation means is a filter having a transfer function.

$$b = DEP \left[ 1 - \frac{1}{4}\left(\frac{S+20}{S+10}\right)^2 \right]$$

where S is the Laplace transform variable, and wherein said rectification and smoothing means yields a signal equal to $2\frac{1}{4}|b|$, and further wherein said suppressing means is comprised of means responsive to the signal output of said smoothing and rectification means for producing a signal $DEC\ 2 = K \cdot e\ (|DEP| - 7)SGN$ where K is a constant gain factor, e is the signal output of said smoothing and rectification means and SGN is the sign of the operator controlled signal DEP, and means for subtracting said signal DEC 2 from the output signal of said control signal.

6. A nonlinear filter system as defined in claim 3 wherein said means for producing said gain factor Kq is a linear function of said ratio from K = 1 at a value of zero for said ratio to K = 0 for said ratio equal to some predetermined value sufficient to eliminate the quadratic term of the control system characteristic.

7. Apparatus for damping operator induced oscillations of a system for control of an element responding to an operator controlled signal comprising a lag-lead filter responsive to a control input signal for frequency and amplitude estimation of the control input signal, and a rectification and smoothing filter responsive to the output of the lag-lead filter for producing an intermediate signal proportional to the absolute value of the frequency and amplitude estimate for use in suppression of the control system output signal, means responsive to the intermediate signal for producing a correction signal and means for subtracting said correction signal from the signal of said control system, thereby to produce an output signal for control with operator induced oscillations damped without rate limiting the controlled element.

8. Apparatus for damping operator induced oscillations of a system for control of an element responding to an operator controlled signal comprising a lag-lead filter responsive to a control input signal for frequency and amplitude estimation of the control input signal, and a rectification and smoothing filter responsive to the output of the lag-lead filter for producing a first signal proportional to the absolute value of the frequency and amplitude estimate for use in suppression of the control system output signal, a second rectification and smoothing filter responsive to the output of the lag-lead filter for producing a second signal proportional to the absolute value of the controlled input signal, means responsive to said first and second signals for generating an intermediate signal proportional to a ratio of the absolute value of said first to the absolute value of said second signal, means responsive to said intermediate signal for generating a gain factor for said control system to produce an output signal for control with operator induced oscillations damped without rate limiting the controlled element.

9. Apparatus as defined in claim 8 including means for providing a minimum level for said first signal in order to assure that said intermediate signal may not be too large when said control input signal becomes very small.

10. Apparatus as defined in claim 9 wherein said means for generating said gain factor has a maximum positive value when said intermediate signal is zero, and decreases linearly as said intermediate signal increases in amplitude until said gain factor crosses zero and reaches a maximum negative value.

* * * * *